Nov. 15, 1960
L. M. HARTON
2,960,674
MULTIPHASE POWER DISTRIBUTING APPARATUS
Filed Sept. 14, 1956
2 Sheets-Sheet 1
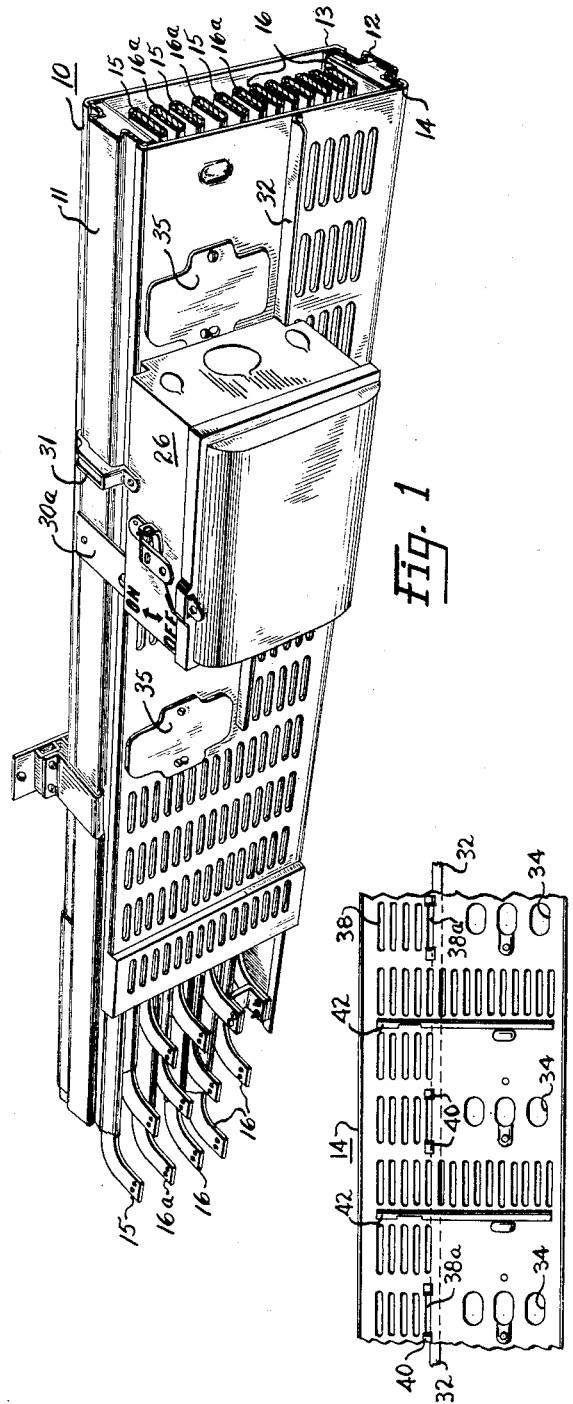
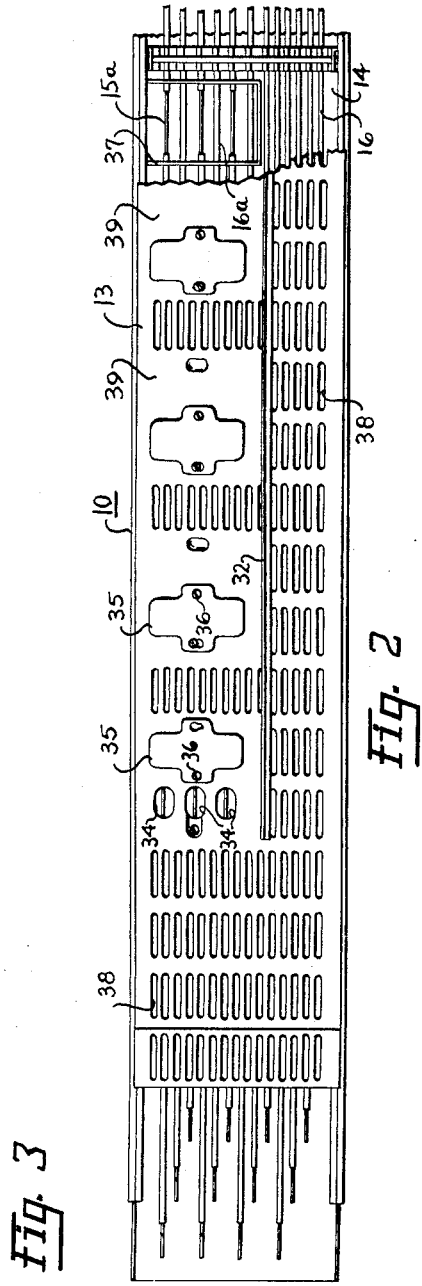
INVENTOR.
Lynn M. Harton
BY Martin Kalikow
HIS ATTORNEY Nov. 15, 1960  L. M. HARTON  2,960,674
MULTIPHASE POWER DISTRIBUTING APPARATUS
Filed Sept. 14, 1956  2 Sheets-Sheet 2

INVENTOR.
Lynn M. Harton
BY Martin Kalikow
HIS ATTORNEY

United States Patent Office 2,960,674
Patented Nov. 15, 1960

2,960,674

MULTIPHASE POWER DISTRIBUTING APPARATUS

Lynn M. Harton, New Britain, Conn., assignor to General Electric Company, a corporation of New York Filed Sept. 14, 1956, Ser. No. 609,906

4 Claims. (Cl. 339—14)

My invention relates to electric power distribution apparatus and particularly to power distribution apparatus of the bus bar type comprising prefabricated sections and adapted to carry alternating current of more than one electrical phase.

Multiphase busway electric power distribution systems are used primarily for two functions. These functions are (a) to transmit power from a point of origin at a primary transformer or substation to a distribution area such as a switchboard or control center, and (b) to provide a number of spaced power outlets from which power can be drawn readily for machines or branch circuits such as by plug-in type power take-off devices.

A prior application, Serial Number 599,405, filed July 23, 1956, by L. E. Fisher and assigned to the same assignee as the present invention, discloses a combined feeder and plug-in busway multiphase electric power distribution system, i.e., one having low reactance and low voltage drop comparable to that of a feeder type distribution system, and readily available power take-off accessibility comparable to that of a plug-in type distribution system. In accordance with the above application, multiphase busway electric power distribution apparatus is provided including two groups of conductors, one group comprising bus bars adapted to receive a plug-in type power take-off device in contact therewith, and the other group comprising fully insulated conductors extending between each adjacent pair of the conductors of the first group respectively. This system provides a low reactance busway while at the same time providing plug-in accessibility.

Busway systems of the aforesaid feeder and plug-in types, have become well established as separate identities in the trade for many years. There are, accordingly, a great number of installations of both types of systems presently in use. Moreover, there are and there will continue to be many applications requiring only such feeder or plug-in systems as compared to a combination system. Extensive lines of connections, elbows, fittings and plugs are, accordingly, manufactured and used for addition to or replacement in such presently installed systems as well as for use with newly installed systems and such manufacture and use is expected to continue.

In accordance with the application mentioned above, a busway is provided in which the bus bars have the same center-to-center spacing transversely of the busway housing as the prior art feeder type of system. Since only every other bar is contacted by the contacts of the plug-in type power take-off device, the spacing between such plug contacts is therefore required to be double the spacing between the individual bars of the busway system. The spacing between contacts of the conventional plug-in type power take-off device, however, is more than double the spacing between the bus bars of the feeder type system. It is therefore not possible to use such plug-in type power take-off devices presently available with the combined feeder and plug-in type busway system of the above application.

It is an object of my invention to provide a combined feeder and plug-in type busway system which is adapted to utilize plug-in type power take-off devices which are presently available.

While it is desirable to have a combined feeder and plug-in type power busway system which is able to utilize the power take-off devices presently available, it is also desirable that sections of such a system be adapted to be readily connected to or combined with sections of the conventional feeder-only type busway.

It is therefore another object of my invention to provide a combined feeder and plug-in type busway which is adapted to utilize the plug-in type power take-off devices of present systems, and also which is capable of being readily interconnected with present feeder type busways.

It is a further object of my invention to provide a combined feeder and plug-in type busway including a housing which is not restricted in lateral dimension to the corresponding lateral dimension of the plug-in type device.

Other objects and advantages of my invention will also become apparent from the following detailed description taken in conjunction with the accompanying drawings.

In accordance with my invention in one form, I provide an elongated, generally rectangular housing with a number of longitudinally extending, closely spaced, parallel bus bar conductors supported therein with at least three bus bars for each electrical phase connected in recurring phase sequence with no two adjacent bus bars connected to share the same phase, thus defining a low reactance, feeder-type busway. A first group of multiphase bus bars is supported in one portion of the housing and is adapted to receive contacts of a plug-in type power take-off device, a second multiphase group of insulated bus bar conductors is interleaved within the first group; and a third group of bus bars is supported adjacent the first and second groups of bus bars. The adjacent conductors of the first and second groups have their intermediate portions spaced apart a distance greater than the corresponding spacing between intermediate portions of the conductors of the third group, but all conductors have their end portions spaced apart uniformly.

In the accompanying drawings:

Figure 1 is a view in perspective of a portion of a busway section constructed in accordance with my invention, a plug-in type power take-off device being shown in place thereon;

Figure 2 is a plan view of a portion of the busway section of Figure 1;

Figure 3 is a plan view of a portion of one of the housing covers of the busway section shown in Figure 1, showing the inside surface;

Figure 4:
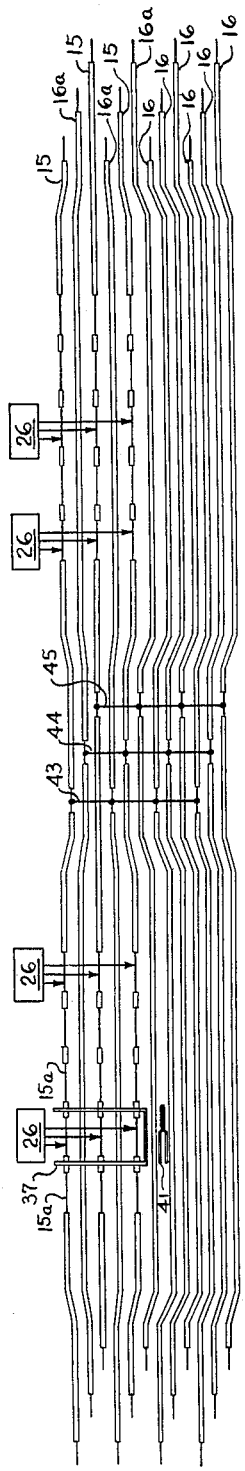
Figure 4 is a schematic representation of a portion of a busway system utilizing busway sections as shown in Figures 1 and 2 and indicating the electrical connection of various bus bars in a three-phase system, and the relation of plug-in type power take-off devices thereto.

Referring to the drawings, I have shown my invention as embodied in a busway section comprising an elongated generally rectangular housing 10 including side walls 11 and 12 and top and bottom walls 13 and 14 respectively, joined together by suitable means such as by screws (not shown) through overlapping edge portions thereof.

The enclosure 10 contains a plurality of elongated generally parallel bus bar conductors including a group of plug-in type conductors 15 supported in side-by-side relation in one portion of the enclosure 10, and another group of conductors 16 supported in another portion of the enclosure 10. Additional conductors 16a are interleaved with the conductors 15 in a manner and for a purpose to be described.

Figure 5:
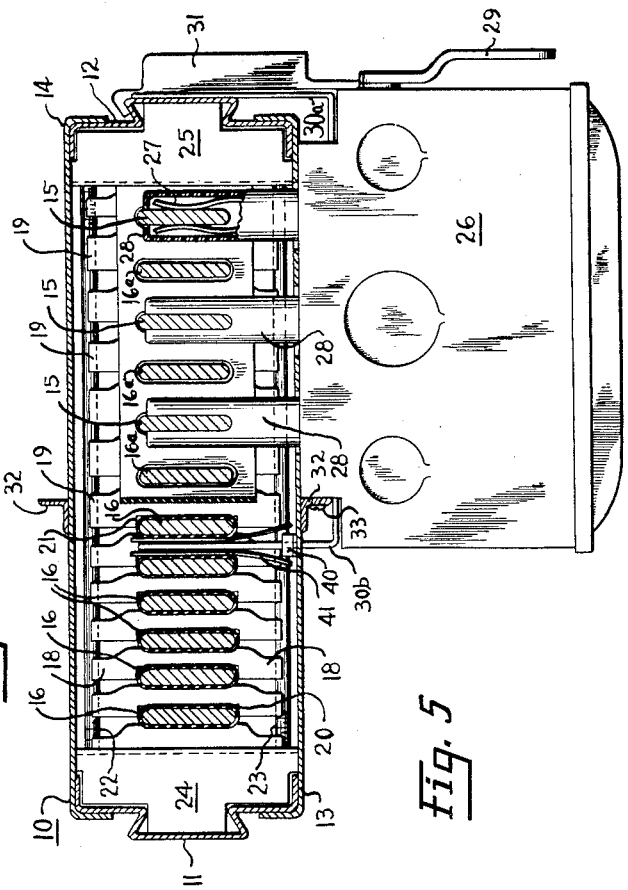
Figure 5 is a sectional view of a busway section similar to Figure 1 also showing a plug-in type power take-off device thereon.

All of the aforesaid conductors 15, 16, and 16a are supported in side-by-side generally parallel relation in a row transversely of said housing by insulating and spacing supports 18 and 19 (see Fig. 5). Each of the insulating supports 18 and 19 comprises a block of insulating material having a generally rectangular recess 20, 21, respectively, in one side thereof. The conductors 15, 16, and 16a are each adapted to be retained between a cooperating pair of such insulators by being received within the recess of one of the insulators and retained therein by the opposite side portion of the adjacent insulator. The insulators and conductors are maintained in assembled relation by tie-bolts 22, 23 each of which has a portion extending through pressure plates 24 and 25 respectively. Retaining nuts (not shown) are threaded on opposite ends of the tie-bolts 22, 23, drawing the pressure plates toward each other and compressing the assembly of insulators and bus bars together.

The insulators 19 are preferably made of greater thickness than the insulators 18, whereby the bus bars 15 and 16a are spaced apart a distance somewhat greater than are the conductors 16. Each of the bus bars 15, 16, and 16a preferably has its opposite ends bent edgewise generally at right angles to the main portion thereof for the purpose of facilitating connection of bus bars of an adjacent busway section thereto. The bus bars 16 and 16a preferably have substantially the entire intermediate portion thereof between the off-set end portions insulated by suitable means such as by taping. The bus bars 15 are insulated throughout a substantial intermediate portion thereof, but have discrete longitudinally spaced portions thereof 15a exposed for contact by the plug-in contacts of a plug-in type power take-off device, 26.

The plug-in type power take-off device 26 includes a generally rectangular box-like body having a number of plug-in type contact jaws 27, extending from the back wall thereof, each surrounded by a sheath of insulating material 28. Metallic barriers 30a and 30b extending from opposite sides at the back wall thereof are also provided for the purpose of protecting the contact jaws 27 and the insulating shields 28 from accidental damage during handling and shipment and also for "grounding" the plug in a manner to be described. The plug-in type power take-off device 26 may contain cable connectors (not shown) or switching apparatus (not shown) such as may be operated by the operating handle 29, for the purpose of controlling the flow of power drawn from the conductors 15, which power may then be conveyed to a power-consuming device by suitable conductor means (not shown).

The plug-in type power take-off device 26 is adapted to be retained on the busway section 10 by means including a clamp 31 at one side which engages a flanged side wall portion of the busway 10. The opposite side of the device 26 is adapted to be attached to an intermediate portion of the bottom cover 14 by means including an angle iron strip 32 which is rigidly attached to the cover 14 by suitable means such as by welding. The device 26 is attached to the strip 32 by a screw 33.

For the purpose of permitting the entry of the contact jaws 27 of the plug-in device 26, the enclosure 10 is provided with a series of longitudinally spaced plug-receiving apertures 34 adapted normally to be covered by covers 35 pivotally supported on the housing of the section 10 by screws 36. Apertures 34 are provided upon both the top and bottom covers 13 and 14, the apertures in the cover 13 being off-set or staggered longitudinally with respect to the apertures in the cover 14. The apertures 34 in the top and bottom covers 13 and 14 are preferably arranged so that access is provided through said covers to separate, but adjacent, portions of each of the discrete contact areas 15a of the bus bar conductors 15.

The plug-in contact areas 15a of the bus bar conductors 15 are preferably transversely aligned with respect to the busway section, and a generally U-shaped insulating shield 37 (see Fig. 2) is provided surrounding each group of plug-in contact areas 15a. The insulator 37 is preferably formed of a tough thin insulating material such as vulcanized cellulosic fiber, and has slots (not shown) cut in from one edge by which it is adapted to fit closely over the bus bars 15 and 16a, being retained in place thereby and by the housing covers. By means of this construction, the plug-in contact areas 15a are effectively shielded and guarded from accidental contact, and also any arcing caused by the making or breaking of contacts at such areas is confined to that immediate portion of the enclosure 10.

When a power take-off plug 26 is mounted on the busway section, one of the metallic barriers 30a extends alongside the side of the housing section 10 (Fig. 1). The other barrier 30b extends within the housing through an aperture 38a adjacent the angle strip 32 and thence between two adjacent bus bars 16 (Fig. 5).

For the purpose of "grounding" the housing of the plug 26, or establishing a good electrical connection between it and the busway section housing, I provide grounding contacts 40, mounted on the inner surface of the covers 13 and 14, at opposite ends of each of the apertures 38a. The contacts 40 are adapted to be engaged by opposite edges of the barrier 30b when the plug 26 is inserted, thereby grounding the plug housing as soon as the plug is inserted in position.

Figure 6:
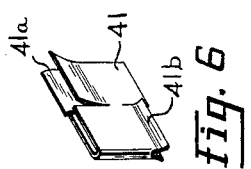
Figure 6 is a perspective view of an insulating member used in the busway section of Figure 1.

For the purpose of preventing damage by the barrier 30b to the insulation of the bus bars 16 between which it enters, I provide a generally U-shaped fiber shield 41 (see Figs. 5 and 6). The fiber shield 41 is cut part way in from opposite edges thereof and its side portions are deformed to provide two pairs of diverging portions 41a and 41b. The diverging portions 41a and 41b are directed toward openings 38a in opposite covers of the housing and are adapted to receive metallic shield portions 30a and 30b, respectively, of plugs mounted on such opposite covers.

For the purpose of providing maximum ventilation and cooling of the busway section 10 while at the same time providing for maximum safety, I provide covers 13 and 14 with ventilated portions, and also with solid or imperforate portions. The ventilated portions include a plurality of relatively small closely spaced elongated apertures 38 and are positioned adjacent the insulated intermediate portions of the bus bars 15, 16, and 16a. The solid cover portions 39, on the other hand, are positioned adjacent the uninsulated plug-in contact areas 15a of the bus bars 15.

Additional reinforcement is provided to the covers 13 and 14 by means of transverse metallic angle strips 42, attached to the inner surfaces of such covers by suitable means, such as by welding.

As pointed out above, the intermediate portions of the bus bars 15 and 16a are spaced apart a distance somewhat greater than the corresponding intermediate portions of the bus bars 16. Such relatively wide spacing of the bus bars 15 provides adequate electrical and mechanical clearance as required by the exposed contact portions 15a and permits the entrance of contact stabs 27.

At the same time, low reactance for the over-all system is provided by two features of the construction. One of these is the incorporation of a group of relatively closely spaced bus bars 16 in another portion of the housing, to which the plug-in bars 15 are interconnected at each juncture of adjacent busway sections, such as at 43, 44, 45 (Fig. 4). In a complete system therefore, each plug-in bus bar 15 has a relatively low impedance path provided by bus bars 16 connected in parallel with it. Another feature is the provision of a group of bus bars 16a interleaved with the group of bus bars 15. Because all the bus bars 15, 16, and 16a are closely spaced and interconnected by the phase collection straps 43, 44, and 45 in recurring phase sequence with no two adjacent bus bars of the same polarity, the effect of the magnetic flux field surrounding the bus bars is therefore such as to reduce the reactance of the plug-in bus bars 15 and hence the impedance of the system.

It will also be observed that the bus bars 16a are completely insulated at the portions between the plug-in areas 15a and they therefore constitute, in effect, an insulating barrier between adjacent exposed portions of the bus bars 15 which helps to minimize any possibility of an arc striking between such portions when plugs are inserted or removed.

In accordance with my invention, the busway section of Fig. 1 is also adapted to be readily interconnected with busway sections of the prior "feeder" only type. For this purpose, the bus bars in each such section are provided with offsets or bends adjacent each end thereof in such a manner that the end portions of all the bus bars are equally spaced apart. The spacing of such ends is preferably made the same as the spacing ordinarily used for low-reactance feeder-type busway sections presently in use. In addition, the offsets of the various bars are arranged so that the entire group of bar-ends is symmetrically positioned between the sides of the housing, whereby the housing as well as the bus bars may be aligned and readily connected to such prior busway sections. Thus it is possible to make connection between a section of my improved feeder or plug-in busway and a section of feeder-only busway at either end, and therefore, to insert a length of this type of busway in an intermediate portion of a run of busway of the prior art type.

It will be observed that by means of the housing and bus bar arrangement provided, together with means for attaching at least one side of the take-off plug to a housing cover, it is possible to extend the number of bus bars used in a given section to any number desired beyond the bars in the plug-in portion. In the embodiment shown, for instance, six additional bars 16 are provided. This may be increased as desired, and in fact is sometimes increased to more than 30 additional bars.

It will be seen that I have provided an improved combined feeder and plug-in busway which may be of any desired capacity, which is adapted to utilize plug-in type power take-off devices having a given spacing between stabs, which is nevertheless readily connectible to another type of busway section having bus bars spaced apart a distance not specially related to the spacing between such plug contact stabs, and which also includes a ventilated housing with plug-in openings therein but still having high mechanical strength.

Many modifications and variations of my invention will naturally occur to those skilled in the art, and while I have shown only one particular embodiment thereof, I wish to have it understood that I intend by the appended claims to cover all such modifications and variations thereof as fall within the true spirit and scope of my invention.

What I claim as new and desire to secure by Letters Patent of the United States is:

1. Multiphase electric power distributing apparatus comprising an elongated generally rectangular housing, a plurality of longitudinally extending parallel bus bar conductors supported in side-by-side relation in a row transversely of said housing and comprising a plurality of conductors for connection to each electrical phase of a multiphase power source, and said conductors including at least some conductors having integral portions thereof exposed for contact by contacts of a plug-in type power take-off device, an aperture in said housing, a plug-in type power take-off device comprising a generally rectangular enclosure, a plurality of plug-in type connectors carried by and projecting from said enclosure, said power take-off device having a pair of spaced protective barriers extending from one wall thereof, means for mounting said device on and externally of said housing with said connectors in contact with at least some of said conductors, at least one of said barriers being of conductive material and projecting within said housing through said aperture when said device is mounted on said housing, and resilient electrically conductive grounding means carried by said housing adjacent said aperture and adapted to contact said conductive barrier upon the insertion of said power take-off device on said housing whereby to electrically connect said barrier to said housing.

2. A low voltage drop plug-in busway section for connection in a multiphase busway system comprising: an elongated housing; a plurality of closely spaced bus bars supported in side-by-side relation in a row transversely of said housing and including at least three bus bars for connection to each phase of a multiphase power source, said bus bars being interlaced and interconnected in recurring phase sequence with no two adjacent bus bars having the same polarity, whereby said busway section exhibits a characteristically low impedance to the electrical power carried thereby; a first group of said bus bars of each polarity having insulating means covering them throughout their lengths except at end portions thereof; a second group of said bus bars of each polarity interspersed within said first group of bus bars, said second group of bus bars having uninsulated surfaces at least at aligned portions thereof intermediate their ends, each bus bar in said second group being separated from the next adjacent bus bar in said second group by at least one of the bus bars in said first group; a third group of said bus bars adjacent said interspersed first and second groups and including at least one bus bar of each polarity, the adjacent bus bars of said third group being more closely spaced than the adjacent bus bars of said first and second groups; and at least one access opening in said housing intermediate the ends thereof adjacent aligned uninsulated surfaces of said second group of bus bars to permit the entry of contact portions of a power take-off device for contact with said second group of bus bars.

3. A low voltage drop plug-in busway section for connection in a multiphase busway system comprising: an elongated housing and enclosed therein a plurality of closely spaced bus bars supported in side-by-side relation in a row transversely of said housing; means electrically interconnecting said bus bars in interlaced recurring phase sequence with at least three bus bars connected to share each electrical phase, no two adjacent bus bars being connected with the same polarity, whereby said busway section exhibits a characteristically low impedance to the electrical power carried thereby; a first group of said bus bars of each polarity having insulating means covering them substantially throughout their lengths; a second group of said bus bars including one bus bar of each polarity interspersed within said first group of bus bars, said second group of bus bars having uninsulated surfaces at least at aligned portions thereof intermediate their ends, the aligned uninsulated portions of each bus bar in said second group being separated from the next adjacent uninsulated portion of a bus bar in said second group by at least one of the insulated bus bars in said first group; a third group of said bus bars adjacent said interspersed first and second groups and including at least one bus bar of each polarity, the adjacent bus bars of said third group being more closely spaced intermediate their end portions than the adjacent bus bars of said first and second groups, the end portions of all of said bus bars being uniformly spaced for connection to corresponding bus bars in an adjacent busway section; and at least one access opening in said housing intermediate the ends thereof adjacent the aligned uninsulated surfaces of said second group of bus bars to permit the entry of contact portions of a power take-off device for contact with said second group of bus bars.

4. A low voltage drop plug-in busway apparatus for connection in a multiphase busway system comprising: an elongated housing; a plurality of closely spaced bus bars supported in side-by-side relation in a row transversely of said housing and including at least three bus bars for connection to each phase of a multiphase power; means electrically interconnecting said bus bars in interlaced recurring phase sequence, no two adjacent bus bars being connected with the same polarity, whereby said busway section exhibits a characteristically low impedance to the electrical power carried thereby; a first group of said interconnected bus bars including at least one bus bar of each polarity having insulating means covering them substantially throughout their lengths; a second group of said interconnected bus bars including one bus bar of each polarity interspersed within said first group of bus bars, said second group of bus bars having uninsulated surfaces at least at aligned portions thereof intermediate their ends, each bus bar in said second group being separated from the next adjacent bus bar in said second group by at least one of the bus bars in said first group; a third group of said interconnected bus bars adjacent said interspersed first and second groups and including at least one bus bar of each polarity the adjacent bus bars of said third group being more closely spaced intermediate their end portions than the adjacent bus bars of said first and second groups; at least one access opening in said housing intermediate the ends thereof adjacent the aligned uninsulated surfaces of said second group of bus bars; and a plug-in power take-off device adjoining said housing and having contact portions extending through said access opening and engaging the said uninsulated surfaces of said second group of bus bars.

References Cited in the file of this patent
UNITED STATES PATENTS

| | | |
|---|---|---|
| 2,043,796 | Frank | June 9, 1936 |
| 2,150,963 | De Mask | Mar. 21, 1939 |
| 2,267,080 | Clayton | Dec. 23, 1941 |
| 2,269,779 | Morten | Jan. 13, 1942 |
| 2,274,089 | O'Brien | Feb. 24, 1942 |
| 2,287,502 | Togesen et al. | June 23, 1942 |
| 2,318,860 | Huguelet | May 11, 1943 |
| 2,356,006 | Samer | Aug. 15, 1944 |
| 2,407,142 | Cole et al. | Sept. 3, 1946 |
| 2,411,128 | Carlson | Nov. 12, 1946 |
| 2,482,310 | Adam | Sept. 20, 1949 |
| 2,653,991 | Dyer et al. | Sept. 29, 1953 |
| 2,786,152 | Fisher | Mar. 19, 1957 |